(12) United States Patent
Allen et al.

(10) Patent No.: US 10,782,859 B2
(45) Date of Patent: Sep. 22, 2020

(54) INTELLIGENT GESTURE BASED WORD SENTENCE AUGMENTATION AND SYSTEMS FOR THE IMPLEMENTATION THEREOF

(71) Applicant: International Business Machines Corporation, Armonk, NY (US)

(72) Inventors: Corville O. Allen, Morrisville, NC (US); Richard G. Bowers, Raleigh, NC (US); Lisa Marie W. Bradley, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1317 days.

(21) Appl. No.: 14/967,799

(22) Filed: Dec. 14, 2015

(65) Prior Publication Data
US 2017/0168580 A1    Jun. 15, 2017

(51) Int. Cl.
*G06F 3/0484* (2013.01)
*G06F 3/023* (2006.01)
*G06F 3/0488* (2013.01)
*G06F 40/253* (2020.01)
*G06F 40/274* (2020.01)

(52) U.S. Cl.
CPC ........ *G06F 3/04842* (2013.01); *G06F 3/0237* (2013.01); *G06F 3/04883* (2013.01); *G06F 40/253* (2020.01); *G06F 40/274* (2020.01)

(58) Field of Classification Search
CPC ............... G06F 3/04842; G06F 3/0237; G06F 3/04883; G06F 17/274; G06F 17/276; G06F 40/253; G06F 40/274

USPC ........................................................ 715/780
See application file for complete search history.

(56) References Cited

U.S. PATENT DOCUMENTS

| 8,713,433 | B1 | 4/2014 | Ouyang |
| 2007/0180409 | A1* | 8/2007 | Sohn ..................... G06F 1/1616 715/863 |

(Continued)

OTHER PUBLICATIONS

Android Free Downloads "ai.type Android L Keyboard Latest APK 2.0.1" http://www.androidfd.com/ai-type-android-l-keyboard-latest-apk.html; accessed Sep. 24, 2015 (8 pages).

(Continued)

*Primary Examiner* — Thu V Huynh
(74) *Attorney, Agent, or Firm* — Cantor Colburn LLP; Alexander Jochym

(57) ABSTRACT

Disclosed herein is a system comprising a user interface comprising an edit region in operative communication with a processor; where the processor is in operative communication with one or more modules; where the processor is operative to receive from the user interface a selection of words in the form of a sentence; use a grammar test to determine if the sentence is grammatically accurate; to parse the sentence and offer a user a choice of words to improve an accuracy of the sentence; where the choice of words is based upon a weighted probability of several possible words that can improve the accuracy of the sentence; and permitting the user to install his/her word choice in the sentence by performing an action involving one or more of swiping, tilting, steering or tapping of the user interface.

14 Claims, 6 Drawing Sheets

(56) References Cited

U.S. PATENT DOCUMENTS

| | | | | |
|---|---|---|---|---|
| 2007/0290999 A1* | 12/2007 | Cho | ............... | G06F 1/1626 |
| | | | | 345/158 |
| 2008/0168366 A1* | 7/2008 | Kocienda | ............ | G06F 3/0237 |
| | | | | 715/764 |
| 2011/0029869 A1* | 2/2011 | McLennan | ............ | G06F 3/017 |
| | | | | 715/702 |
| 2011/0161889 A1* | 6/2011 | Scheer | ............ | G06F 3/04815 |
| | | | | 715/863 |
| 2012/0131519 A1* | 5/2012 | Jitkoff | ............ | G06F 3/0481 |
| | | | | 715/863 |
| 2013/0253906 A1 | 9/2013 | Archer | | |
| 2014/0201671 A1* | 7/2014 | Zhai | ............... | G06F 3/0237 |
| | | | | 715/773 |
| 2015/0121285 A1* | 4/2015 | Eleftheriou | ......... | G06F 3/04842 |
| | | | | 715/773 |
| 2016/0371250 A1* | 12/2016 | Rhodes | ............ | G06F 17/276 |

OTHER PUBLICATIONS

Don Johnston "Co:Writer App" http://donjohnston.com/cowriterapp/#.VgOqzZfgFKV; accessed Sep. 24, 2015 (9 pages).

Ginger "Ginger Keyboard +Page For Android" http://www.gingersoftware.com/android-keyboard-page#.VgO3JZfgHOR; accessed Sep. 24, 2015 (5 pages).

Lowensohn et al. "7 keyboards for iOS 8 you can try right now" http://www.theverge.com/2014/9/17/6341569/here-are-the-ios-8-keyboards-you-can-get-right-now-and-6-to-get-later; Oct. 17, 2014 (9 pages).

\* cited by examiner

INTELLIGENT GESTURE BASED WORD SENTENCE AUGMENTATION AND SYSTEMS FOR THE IMPLEMENTATION THEREOF

BACKGROUND

This disclosure relates to intelligent gesture based word sentence augmentation and systems for the implementation thereof.

Many electronic devices provide an option for a user to enter information. For example, a mobile device (e.g., a smart phone) may use an input device, such as a keypad or a touchscreen, for receiving user input. A touchscreen may send a signal to the device when a user touches a virtual object on the touchscreen with a finger or a pointing device.

In order to maximize portability, manufacturers frequently design mobile devices to be as small as possible. One problem associated with small mobile devices is that there may be limited space for the user interface. For example, the size of a display, such as a touchscreen display, may be relatively small. Similarly, for mobile devices that include a keyboard or keypad, the keys may be smaller or more tightly arranged than a "normal" one. The small display size or key size may make it difficult for the user to easily interact with the mobile device.

To assist users in entering text via keypads or touchscreens, predictive text entry techniques are known in which the current set of characters, entered by the user, are used to predict one or more words. The predicted words may be presented to the user. The user may choose one of the predicted words to complete the word that the user is currently entering. This mode of entry is however, slow and time consuming in addition to often being confusing. For example, in order to currently correct issues in the text one needs to tap <delete> and <edit>. On a tablet or smart phone with a smaller screen size this is often not so easily accomplished.

With the increasing use of tablets and smart phones with high tech keyboards, it follows that there should be a more suitable manner for entering words into a sentence or even into a paragraph on a small screen.

SUMMARY

Disclosed herein is a system comprising a user interface comprising an edit region in operative communication with a processor; where the processor is in operative communication with one or more modules; where the processor is operative to receive from the user interface a selection of words in the form of a sentence; use a grammar test to determine if the sentence is grammatically accurate; to parse the sentence and offer a user a choice of words to improve an accuracy of the sentence; where the choice of words is based upon a weighted probability of several possible words that can improve the accuracy of the sentence; and permitting the user to install his/her word choice in the sentence by performing an action involving one or more of swiping, tilting, steering or tapping of the user interface.

Disclosed herein too is a method comprising inputting into an edit region of a user interface a plurality of sentences; where the user interface is in communication with a processor; receiving from the a choice of words to improve an accuracy of one or more sentences in the plurality of sentences; where the choice of words is based upon a weighted probability of several possible words that can improve the accuracy of the one or more sentences; and permitting the user to install his/her word choice in the one or more sentences by performing an action involving one or more of swiping, tilting, steering or tapping of the user interface.

Disclosed herein too is a computer program product comprising a non-transitory storage medium readable by a processing circuit and storing instructions for execution by the processing circuit for performing a method comprising inputting into an edit region of a user interface a plurality of sentences; where the user interface is in communication with a processor; receiving from the a choice of words to improve an accuracy of one or more sentences in the plurality of sentences; where the choice of words is based upon a weighted probability of several possible words that can improve the accuracy of the one or more sentences; and permitting the user to install his/her word choice in the one or more sentences by performing an action involving one or more of swiping, tilting, steering or tapping of the user interface.

DETAILED DESCRIPTION

Disclosed herein is a method of editing text on a screen of a mobile user interface using a combination of gestures done in concert with the word choices offered on a smart keyboard. The method disclosed herein permits one to intelligently place a designated word in the right place within a sentence, paragraph, document or text area. Disclosed herein too is a system for editing text on the screen using a combination of gestures and proffered word choices. The system allows an editor to place a word at a precise point in a sentence or in a paragraph using a combination of body gestures, movements of the user interface, proffered words and on-screen graphics.

In an embodiment, the system uses a combination of the type of gesture movement, the movement of the user interface, the sentence structure and the grammatical nature of the existing or possible sentences to determine the best possible placement of the word or phrase by scoring and weighting available options. The gesture movement in combination with the existing or possible sentence determines a weighted option for placing a desired word in the front, the middle or the end of the sentence in addition to weighting the subject object-verb relationship in the sentence and the parts of speech options for the selected word.

This system is advantageous especially for a smart keyboard that offers mainly words as options for correcting sentences rather than letters. The logic used in this system would facilitate the best placement of a word or a phrase based on an existing sentence being built or augmented. In an embodiment, the user would just select and gesture by throwing the words in certain arcs and based on an intelligence algorithm, the word would fall in the correct place based on grammar and gesture. This system offers numerous advantages that include a much faster and intuitive system than the present system currently deployed in mobile devices that includes copying and pasting to place words in a desired position in a sentence.

The system is much faster and intuitive for young kids with a keyboard palette of words that are being used to create sentences or a sentence. It helps keep keyboards relevant with new technologies such as tablets. It helps to easily correct typos in the text or add new words into text without any significant cutting and pasting.

Figure 1:
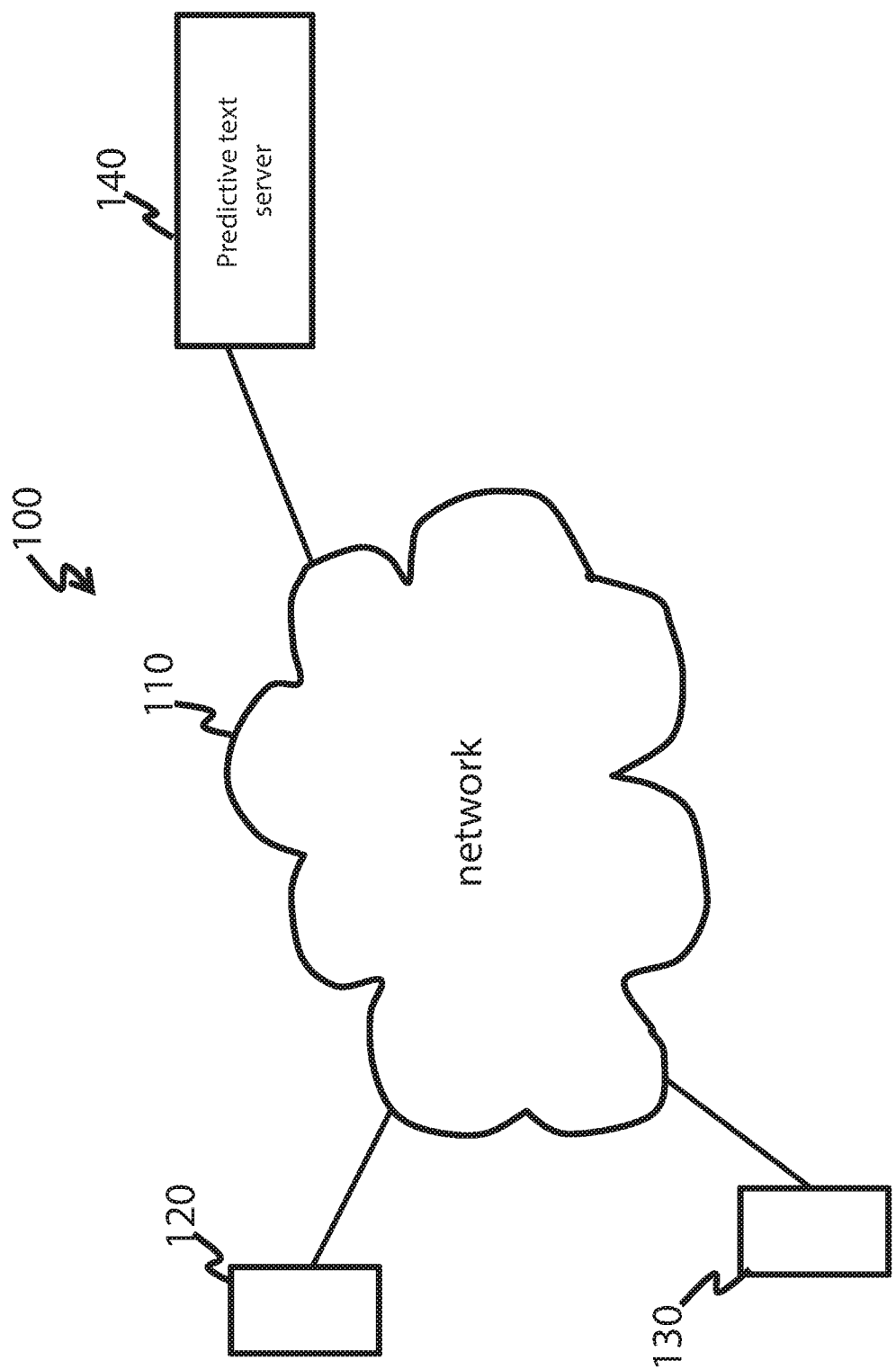
FIG. 1 is a diagram of an exemplary environment in which systems and/or methods detailed herein may be implemented.

FIG. 1 is a diagram of an exemplary environment 100 in which systems and/or methods described herein may be implemented. As illustrated, environment 100 may include a network 110 that connects a number of devices and/or systems. The devices and/or systems may include mobile devices 120 and 130 and a server, labeled as predictive text server 140.

Network 110 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks. Network 110 may particularly include one or more wireless portions that provide wireless connectivity to mobile devices 120 and 130.

Mobile devices 120 and 130 may include portable computing and communication devices, such as a personal digital assistant (PDA), a smart phone, a cellular phone, a laptop computer with connectivity to a cellular wireless network, a tablet computer, and the like. Mobile devices 120 and 130 may connect, through a radio link, to network 110.

Mobile devices 120 and 130 may provide textual input interfaces that use predictive text entries. For example, mobile devices 120/130 may include touchscreen displays through which a user can enter text through a virtual keyboard presented on the touchscreen display, or alternatively, use swiping motions across the touchscreen or tilting motions of the mobile device to effect text entry. The user may input one or more characters via the touchscreen display, such as by tapping keys on the virtual keyboard. Mobile devices 120/130 may generate, based on the current set of characters that were entered by the user, one or more predictions, where each prediction may be a word or a phrase that the user may be inputting. In one implementation, mobile devices 120/130 may generate the predictions using a locally implemented predictive text component (e.g., software executed by mobile devices 120/130). In an alternative implementation, mobile devices 120/130 may generate the predictions based on a predictive text component implemented remotely by predictive text server 140 or based on a combination of a locally implemented and remotely implemented predictive text component. Techniques for implementing the predictive text component will be described in more detail below.

Environment 100 may additionally include predictive text server 140, which may be in communication with the network 110. Predictive text server 140 may include, for example, web servers, application servers, or other types of servers that provide services or functionality to mobile devices 120/130. Predictive text server 140 may generally act to provide predicted text as a network service, to mobile devices 120/130, or to assist mobile devices 120/130 in the generation of predicted text, such as by providing prediction rules or grammar to mobile devices 120/130.

One network 110, two mobile devices 120 and 130, and one server 140 are illustrated in FIG. 1 for simplicity. In practice, there may be additional or fewer networks 110, mobile devices 120/130 and/or servers 140.

Although FIG. 1 shows exemplary components of environment 100, in other implementations, environment 100 may contain fewer components, different components, differently arranged components, or additional components than those depicted in FIG. 1. Alternatively, or additionally, one or more components of environment 100 may perform one or more other tasks described as being performed by one or more other components of environment 100.

Figure 2:
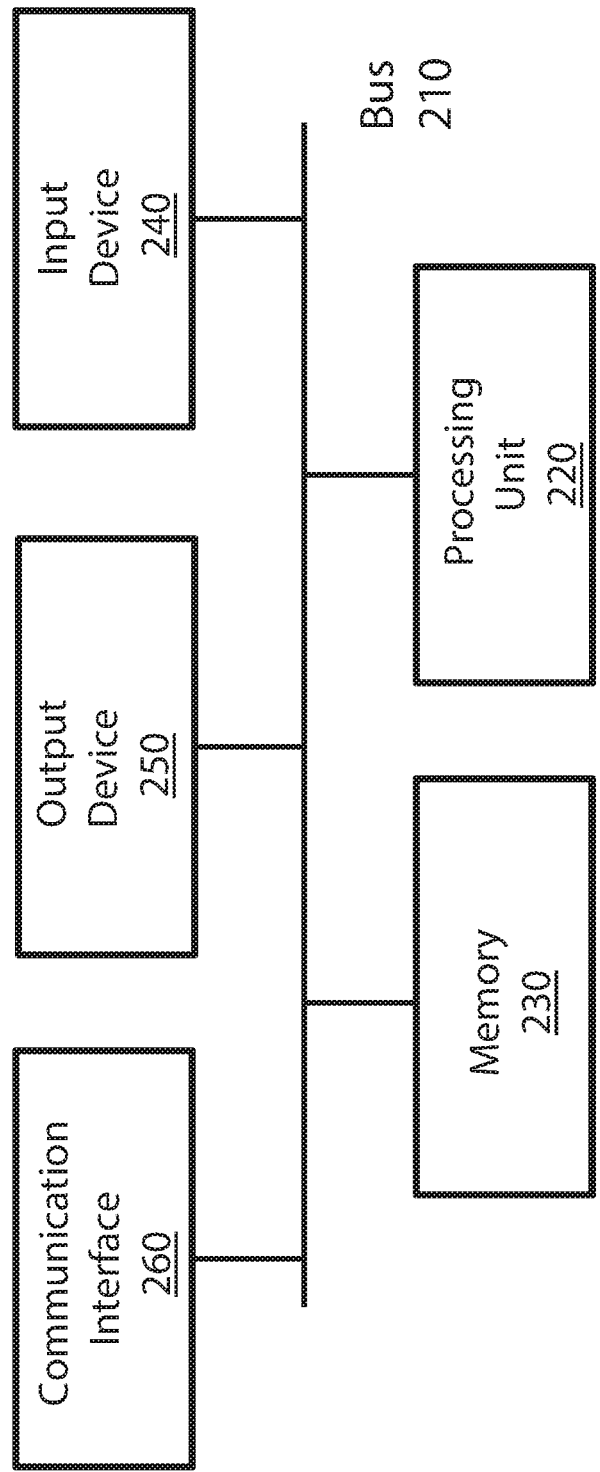
FIG. 2 is a diagram of exemplary components of a device that corresponds to a mobile device or to a predictive text server.

FIG. 2 is a diagram of exemplary components of a device 200 that may correspond to one or more devices of environment 100, such as one of mobile devices 120/130 or predictive text server 140. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more Application Specific Integrated Circuits (ASICs), Field Programmable Gate Arrays (FPGAs), or the like.

Memory 230 may include a random access memory (RAM) or another type of dynamic storage device that stores information and instructions for execution by processing unit 220, a read-only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touchscreen display, one or more biometric mechanisms, and the like. When device 200 includes one of mobile devices 120/130, input device 240 may particularly include a touchscreen display or a keyboard or keypad design for mobile devices 120/130. Output device 250 may include a device that outputs information to the operator, such as the touchscreen display, a speaker, and the like. The touchscreen display for the output device 250 and for the input device 240 may be the same display.

Communication interface 260 may include any transceiver-like mechanism that enables device 200 to communicate with other devices and/or systems. For example, communication interface 260 may include mechanisms for communicating with other devices, such as other devices associated with environment 100. When device 200 includes one of mobile devices 120/130, communication interface 260 may include antennas and other circuitry associated with wireless communication.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
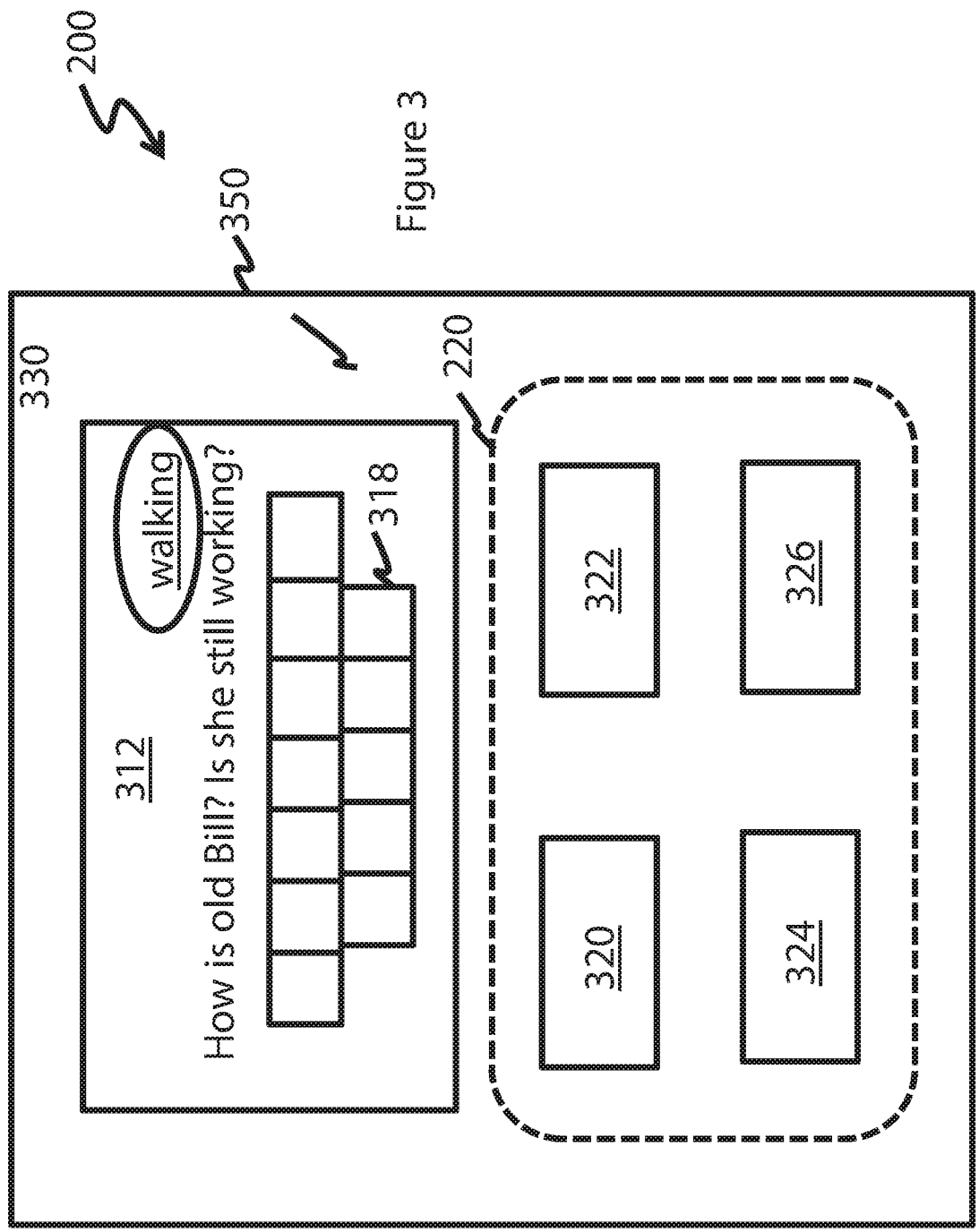
FIG. 3 depicts an embodiment where the processing unit of the device may further comprise a plurality of different modules for implementing the incorporation of words, phrases or sentences into a document at desired locations.

FIG. 3 depicts an embodiment where the processing unit 220 of the device 200 may further comprise a plurality of different modules for implementing the incorporation of words, phrases or sentences into a document at desired locations in the document. In the FIG. 3, the processing unit 220 is in communication with a user interface 350. The processing unit 220 may comprise a user interface ("UI") module 320, a keyboard module 322, a gesture module 324, and spatial model ("SM") module 326. Modules 320, 322, 324, and 326 may perform operations described herein using software, hardware, or a mixture of both hardware and software residing in and executing on the device 200. The device 200 may execute modules 320, 322, 324, and 326 with multiple processors. The device 200 may execute modules 320, 322, 324, and 326 as a virtual machine executing on underlying hardware.

The user interface 350 of device 200 may include a presence-sensitive screen that may receive tactile user input from a user of device 200. User interface 350 may receive tactile user input by detecting one or more taps and/or gestures from a user of device 200 (e.g., the user touching or pointing to one or more locations of user interface 350 with a finger or a stylus pen). The presence-sensitive screen of user interface 350 may present output to the user. User interface 350 may present the output at the user interface which may be related to functionality provided by device 200. For example, user interface 350 may present various functions and applications executing on device 200 such as an electronic message application, a map application, and the like. User interface 350 may present one or more information and control panels, such as a notification panel that includes notification information for a user and a settings panel that includes system settings information of device 200.

User interface (UI) module 320 may cause user interface 350 to present to the user graphical elements displayed at various locations of user interface 350. FIG. 3 illustrates edit region 312 and graphical keyboard 318 of user interface 350. Graphical keyboard 318 includes graphical elements displayed as keys. Edit region 312 may include graphical elements such as images, objects, hyperlinks, characters of text, and the like. In the example of FIG. 3, edit region 312 includes graphical elements displayed as characters of text and candidate word 330. A user of device 200 may enter text in edit region 312 by providing user input at locations of user interface 350 that display the keys of graphical keyboard 318.

UI module 320 may act as an intermediary between various components of device 200 to make determinations based on input detected by user interface 350 and generate output presented by user interface 350. For instance, UI module 320 may receive, as an input from keyboard module 322, a representation of a keyboard layout of the keys included in graphical keyboard 318. UI module 320 may receive, as an input from gesture module 324, a sequence of motion events generated from information about user input detected by user interface 350. UI module 320 may determine, based on the location components in the sequence motion events, one or more location components approximates a selection of one or more keys (e.g., UI module 320 may determine the location of each of the motion events corresponds to an area of user interface 350 that presents graphical keyboard 318). UI module 320 may transmit, as output to keyboard module 322, the sequence of motion events received from gesture module 324, along with locations where user interface 350 presents each of the keys. In response, UI module 320 may receive, as an input from keyboard module 322, a character string and one or more candidate words.

UI module 320 may update user interface 350 to include a sentence to be corrected and the one or more candidate words within edit region 312 and cause user interface 350 to display the corrected sentence.

Keyboard module 322 of device 200 may transmit, as output to UI module 320 (for inclusion as graphical keyboard 318) a keyboard layout including a plurality of keys related to one or more written languages (e.g., English, French, Russian, and the like.). Keyboard module 322 may assign one or more characters or operations to each key of the plurality of keys in the keyboard layout. For instance, keyboard module 322 may generate a QWERTY keyboard layout including keys that represent characters used in typing the English language. The QWERTY keyboard layout may also include keys that represent operations used in typing the English language (e.g., backspace, delete, spacebar, enter, and the like.).

Keyboard module 322 may receive data from UI module 320 that represents the sequence of motion events generated by gesture module 324. Keyboard module 322 may also receive data from UI module 320 that represents locations of the presence-sensitive screen of user interface 350 where user interface 350 presents each of the keys of graphical keyboard 318. Keyboard module 322 may determine, based on the locations of the keys, the sequence of motion events represents a selection of one or more keys. Keyboard module 322 may generate a character string based on the selection where each character in the character string corresponds to at least one key in the selection. Keyboard module 322 may send data indicating the character string to UI module 320 for inclusion in edit region 312 of user interface 350.

Gesture module 324 of the device 200 may receive from the user interface (the display screen) one or more indications of user input detected at a presence-sensitive screen. Each time the user interface receives an indication of user input detected at a location of the presence-sensitive screen, gesture module 324 may receive information about the user input from the user interface. Gesture module 324 may assemble the information received from user interface 350 into a time-ordered sequence of motion events. Each motion event in the sequence may include a location component corresponding to a location of user interface 350, a time component related to when user interface 350 detected user input at the location, and an action component related to whether the motion event corresponds to a lift up or a push down at the location. Gesture module 324 may determine the sequence of motion events represent characteristics of a gesture, such as a start location of a gesture, a length of a gesture, a velocity of a gesture, an end location of a gesture, and the like. Based on the characteristics, gesture module 324 may determine a user input represents a tap gesture and/or a continuous swipe gesture. Gesture module 324 may transmit, as output to user interface module 320, the sequence of motion events. In an embodiment, while not being limited thereto, gestures are generally made by swiping from the center of the edit region 312 towards the periphery of the edit region.

To determine the sequence of motion events represents a selection of one or more keys, keyboard module 322 includes spatial model (SM) module 326. SM module 326 may compare the location components (e.g., coordinates) in the sequence of motion events to respective locations of one or more keys of graphical keyboard 318 and generate a probability that a selection of a key occurred. In an embodiment, the spatial module 326 is operative to translate angular motion (called tilting) or rotary motion (called steering) of the user interface 350 into position sensitive information for the location of words in sentences, or alternatively, for the location of letters in a word. In an embodiment, by tilting the user interface 350, a corrective word may be displaced from one sentence to an adjacent sentence. By repeatedly tilting the user interface 350 in one direction, the word may be successively moved from one sentence to the next either towards the beginning of the text or towards the end of the text. Similarly, by rotating the user device, a corrective word may be moved successively in one direction or another within a sentence (e.g., either towards the beginning of the sentence or towards the end of the sentence).

SM module 326 may determine a probability (i.e., a spatial model probability or a SMP) that one or more motion events in the sequence indicate an individual selection of a key of graphical keyboard 318. For example, SM module 326 may compare the location component of each motion event in the sequence of motion events to a key location of a particular key of graphical keyboard 318. The location component of each motion event in the sequence may include one or more locations of user interface 350. A key location (e.g., a centroid of a key) of a key in graphical keyboard 318 may include a different location of user interface 350. SM module 326 may determine a probability based on the comparison that the motion event corresponds to a selection of the key based on a distance between the two locations. SM module 326 may correlate a higher probability to a key that shares a smaller distance with a motion event than a key that shares a greater distance with the motion event (e.g., the probability of a key selection may exceed ninety nine percent when a key shares a near zero distance to a motion event and the probability of the key selection may decrease approximately proportionate to an increase in the distance). Based on the SMP associated with each key, keyboard module 322 may assemble the individual key selections with the highest spatial model probabilities into a time-ordered sequence of keys that keyboard module 322 may then determine represent a character string.

In an embodiment, the device 200 facilitates the use of a number of gestures via the gesture module 324 for adding text such as words or phrases to a sentence or to a paragraph for effecting a quick correction. Gestures can comprises swiping in a variety of different directions to position a proffered word choice at a desired position in a particular sentence, tapping one or more times on particular word choices (proffered at the user interface 350 by the user interface module 320) to determine the location of the word in a particular sentence, using a color slider or wheel proffered by the keyboard module 322 that changes with an angle of tilt of the user interface 350 to determine which sentence in a paragraph a particular word may be added to, using a variable directional indicator formed for each sentence around the user interface 350, and the like.

A number of different rules can be employed for using gestures to correct for errors in the text. Some of the rules are detailed below with reference to the FIG. 3. With reference now to the FIG. 3, if utilizing a virtual keyboard with words (the average length of a sentence is 15 words long), then the general swiping rules to place words in the right sentence/location in the text are:

a) tap word n times and swipe from center to top of the edit region 312 to place the word in the middle of the $n^{th}$ sentence, where "n" is an integer that reflects the position of the word in the sentence. All swiping is performed on the edit region 312 of the user interface 350. Thus, if the word is tapped three times and then a swipe is made from the bottom of the edit region 312 towards the top, the word is placed in the middle of the $3^{rd}$ sentence.

b) starting at the left most swipe position and swiping across the edit region 312 and going in counter clockwise direction for positioning the word in a sentence, the rule is:

i) Swipe to the left from the center of the edit region 312 to place the word in the first most position of the last sentence; ii) Swipe to the top left from the center of the edit region 312 to place the word in the second position of the last sentence; iii) Swipe straight up from the center of the edit region 312 to place the word in the third position of the last sentence, and so on. Continuing in this fashion the word can be placed in the 9th position of the last sentence if the user taps on the word and swipes towards the bottom left position from the center of the edit region 312.

In another embodiment, tapping on a word a plurality of times may be combined with swiping to facilitate locating a position for the word or phrase in a sentence. The number of taps determine the sentence that is to be modified while the direction of the swipe determines the position in the sentence that the word is to be placed. For example, by i) double tapping on the word and swiping to the left from the center of the edit region 312, the word is placed in the $1^{st}$ position of the second to last sentence; ii) double tap the word and swipe to the top left from the center of the edit region 312 or the $2^{nd}$ position in the second to last sentence. In this manner by continuing to double tap and swipe sequentially in a counterclockwise direction to the bottom right (from the center of the edit region 312), the word can be put in the $9^{th}$ position of the second to last sentence. The sentence to be altered will be highlighted depending on the number of times the user taps on the word. This helps the user determine whether this is the correct sentence that should be edited. Continuing in this manner, if the user triple taps on the word and swipes to the left, the word will be placed in the $1^{st}$ position of the $3^{rd}$ to last sentence.

In an embodiment, directional tilting (flipping) or steering of the user interface 350 may also be used to position words in sentences. Tilting (flipping) or steering the user interface 350 (e.g., tablet/phone) while the word is being placed facilitates placing it in the right position in a sentence, or alternatively, the word will be placed in the desired position in the desired sentence in a paragraph. In an embodiment, by steering the tablet after a sentence is drafted, a corrective word will automatically be positioned into the last sentence drafted. However, if the user interface is tilted (flipped) through a given angle from its previous position, the word may be placed into a sentence that is previous to the last one. By increasing the number of tilts (flips), the corrective word can be moved to a sentence that is progressively proportionally removed from the last sentence. For example, by tilting the user interface 350 10 times, the word can be positioned in a sentence that is 10 sentences before the last sentence. In other words, the plurality of times that a user interface is tilted is proportional to the number of sentences from the last sentence that the word will be placed in.

The direction of tilt can be used to move the word to a sentence that is closer to the top of the edit region 312, or alternatively, to a sentence that is at the bottom of the edit region 312. Shaking the user interface 350 can be used to undo the last word placement if desired. Combinations of different angles of tilt can be used to move a word from a position in one sentence to an identical position in another sentence.

The same combination of swiping, tapping (e.g., double tapping), steering, and/or tilting of the user interface 350 that was used to position a word in a sentence may also be used to position letters in a word. In an embodiment, as a user prepares to edit text, the user interface can present the user with a choice as to whether he/she wants to place words in a sentence, or alternatively, to place letters in a word.

The general swiping rules to place letters in the right word/location includes tapping the letters on a virtual keyboard a certain number of times to position the letter in a specific position in a word. For example, by using a combination of tapping and swiping, the letter can be placed in a specific position in a word in the text. By tapping a particular letter on the keyboard "n" times and swiping in a particular direction, the letter can be placed in a selected word at a specific point in the word. For example, by tapping a particular letter from a virtual keyboard 2 times and swiping to left from the center, the letter may be placed in a first position in the second word.

In general, the average length of a word is 5 letters and if utilizing a keyboard with single keys (that represent the letters in the alphabet), then by first tapping on the desired letter and starting a swipe towards the left most swipe position from the center of the edit region 312 and proceeding in a counter clockwise position for the word, one may position the letter as follows:

a) Swipe to the left (from the center of the edit region 312) to place the letter to the first position in the last word; b) Swipe to the top left (from the center of the edit region 312) to place the letter to a second position of the last word; and c) Swipe straight up to place the letter in the third position of the last word. By continuing on to swipe to the bottom left position (from the center of the edit region 312), one may place in the selected letter (obtained by tapping on the letter first) in the $9^{th}$ position of the last word.

In another embodiment, by tapping on the letter "n" times and swiping in a particular direction, the letter can be placed in a particular position of the $n^{th}$ to last word. The direction of the swipe determines the position of the letter and the number of taps determines the word in which the letter is to be placed. For example, by double tapping on a particular letter and swiping from right to left on the edit region 312, the letter can be placed in the $1^{St}$ position of the second to last word. Similarly, by double tapping on the letter and swiping from the center of the edit region 312 to the top left of the edit region 312, the letter can be placed in the $2^{nd}$ position of the second to last word. By continuing to double tap on a letter and changing the direction of the swipe, one can vary the position of the letter in the second to last word. Thus by swiping from the center of the edit region 312 to the bottom right, the letter can be placed in the $9^{th}$ position of the second to last word.

In summary, by tapping "n" times on a particular letter, the letter can be placed in the $n^{th}$ to last word in the sentence. The direction of the swipe may be used to determine the position of the letter in the particular word. In an embodiment, the word to be altered will be highlighted depending on the number of times the user taps on the letter. This assists the user in determining the right word to be corrected.

If the user needs to do a double letter (e.g., "dd" instead of just "d") the user needs to pause between pressing the first "letter" and the second "letter", to help the system understand that this was not a double tap, but rather another submission of the letter that is to be inserted into the word.

In an embodiment, directional tilting (flipping) or steering of the user interface 350 may also be used to position letters in words. Tilting or steering the user interface (e.g., the tablet/phone) while the letter is being placed in a word facilitates placing it in the right position in a word, or alternatively, the letter will be placed in the desired position in the desired word. In an embodiment, by steering the tablet after a word is drafted, a corrective letter will automatically be positioned into the last word drafted. However, if the user interface is flipped through a given angle from its previous position, the letter may be placed into a word that is previous to the last one. By increasing the number of flips, the corrective letter can be moved to a word that is progressively proportionally removed from the last sentence. For example, by tilting the user interface 350 10 times, the letter can be positioned in a sentence that is 10 positions before the last word.

Shaking or vibrating the user interface 350 can be used to undo the last letter placement if desired. In other words, shaking or vibrating the user interface can reverse the last made change. Combinations of different angles of tilt can be used to move a letter from a position in one word to an identical position in another word.

Figure 4:
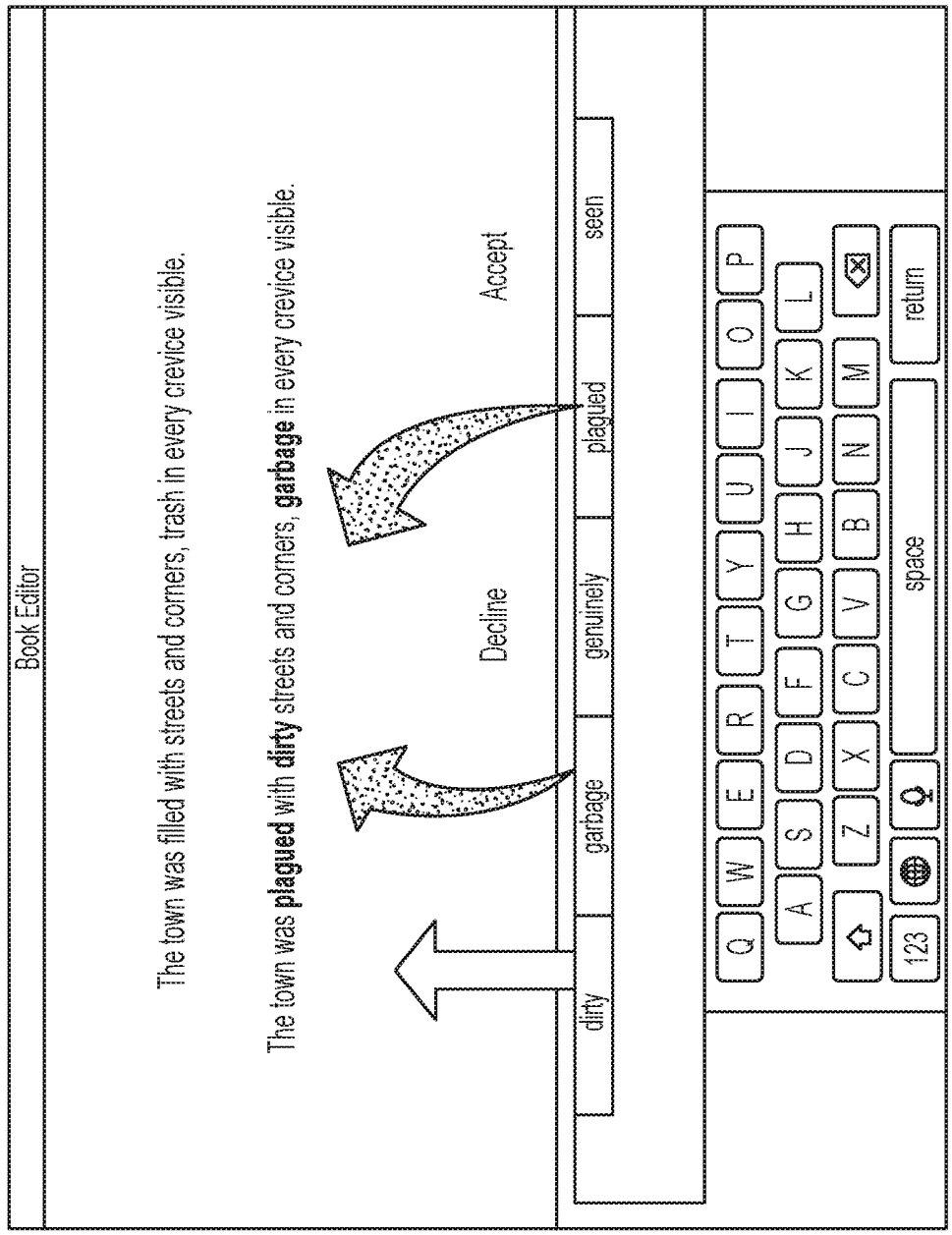
FIG. 4 is an exemplary schematic flow diagram of an algorithm that facilitates correcting errors in sentences or in words using the system detailed herein.

In another embodiment, the system can use subject/verb relationships in the sentence structure to parse the sentence and put the word in the correct spot in the sentence. This is depicted in the algorithm 500 in the FIG. 4. The system can provide suggested words that will make sentences clearer and better grammatically formatted. The system may auto suggest words that fit into the sentence or into several sentences at one time. The system may highlight suggested spot(s) for the word to fit based on the subject/verb relationship in the sentence structure (See Step 502). The user may then tap the suggested word and perform swiping, tilting and/or steering gestures as outlined above to accept (See Step 504) or to decline (See Step 508) placing the proposed word into the sentence.

If a user taps on a word (or letter) and performs a swipe in a particular direction, the system would auto place the word in a sentence (or place the letter in a word). The user can either accept the corrected sentence (or the corrected word) (See Step 506), or alternatively, the user may use the swiping rules proposed above to place the word in a different location from that suggested by the system (See Step 510). If the user declines this second location of the new word, then new word suggestions may be put forth by the keyboard module 322 in the edit region 312 (See Step 510). Alternatively, the user may type out a word of his/her own or use speech to text facilities to have a word of his/her own placed in the edit region 312 (See Step 512). The user can then ask the system to suggest a placement of placements that make grammatical sense. Upon being provided suggestions by the system, the user can use a combination of swiping, tapping, steering and/or tilting to properly place the word or letter as is the case. One or more of swiping, tapping, steering and/or tilting may be used to properly place the word or letter in its position in the sentence.

Figure 5:
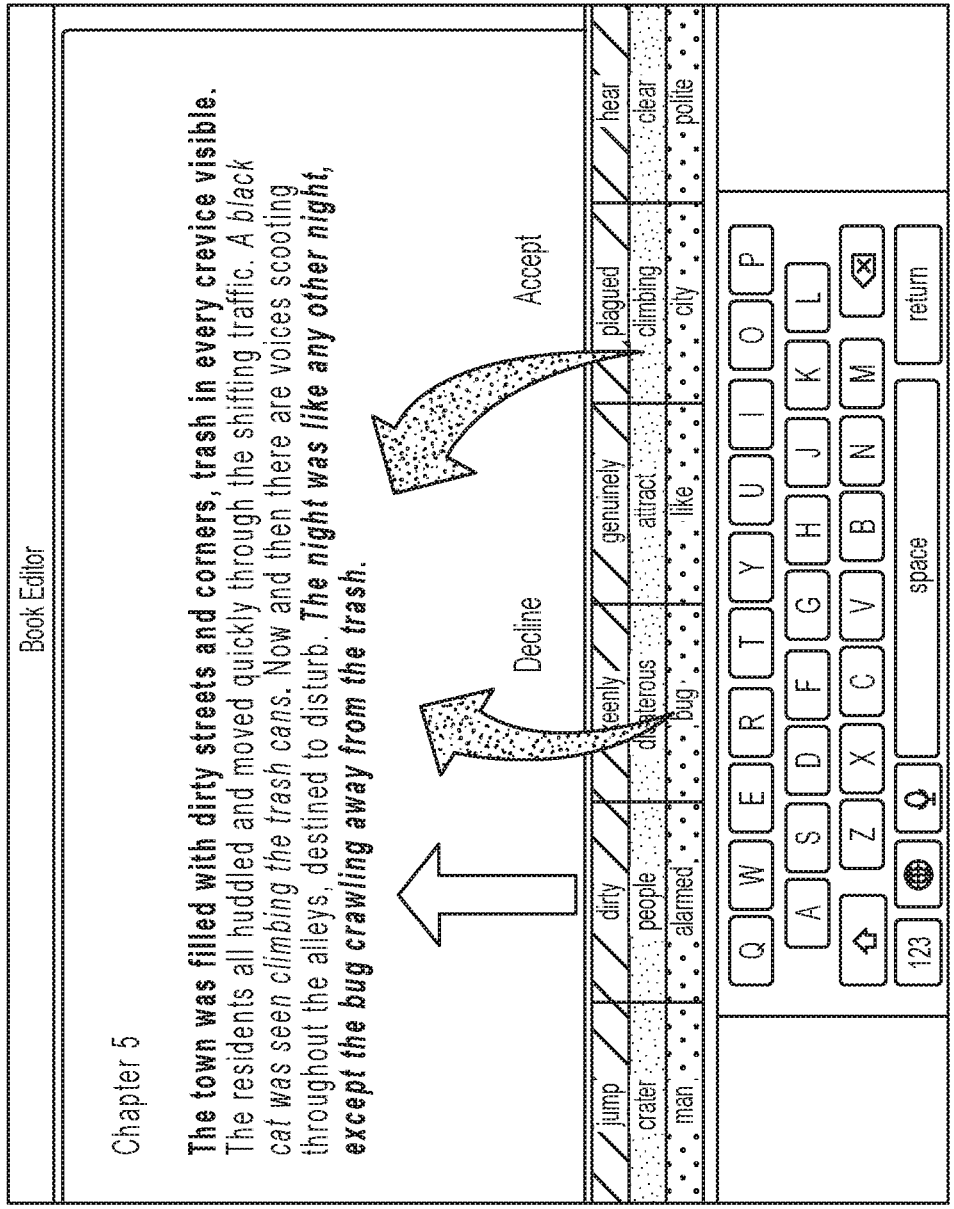
FIG. 5 depicts an embodiment where when a user selects a word and gestures by throwing the words in certain arcs, the word would fall in the correct place based on grammar and gesture as a result of the intelligence algorithm.
Figure 6:
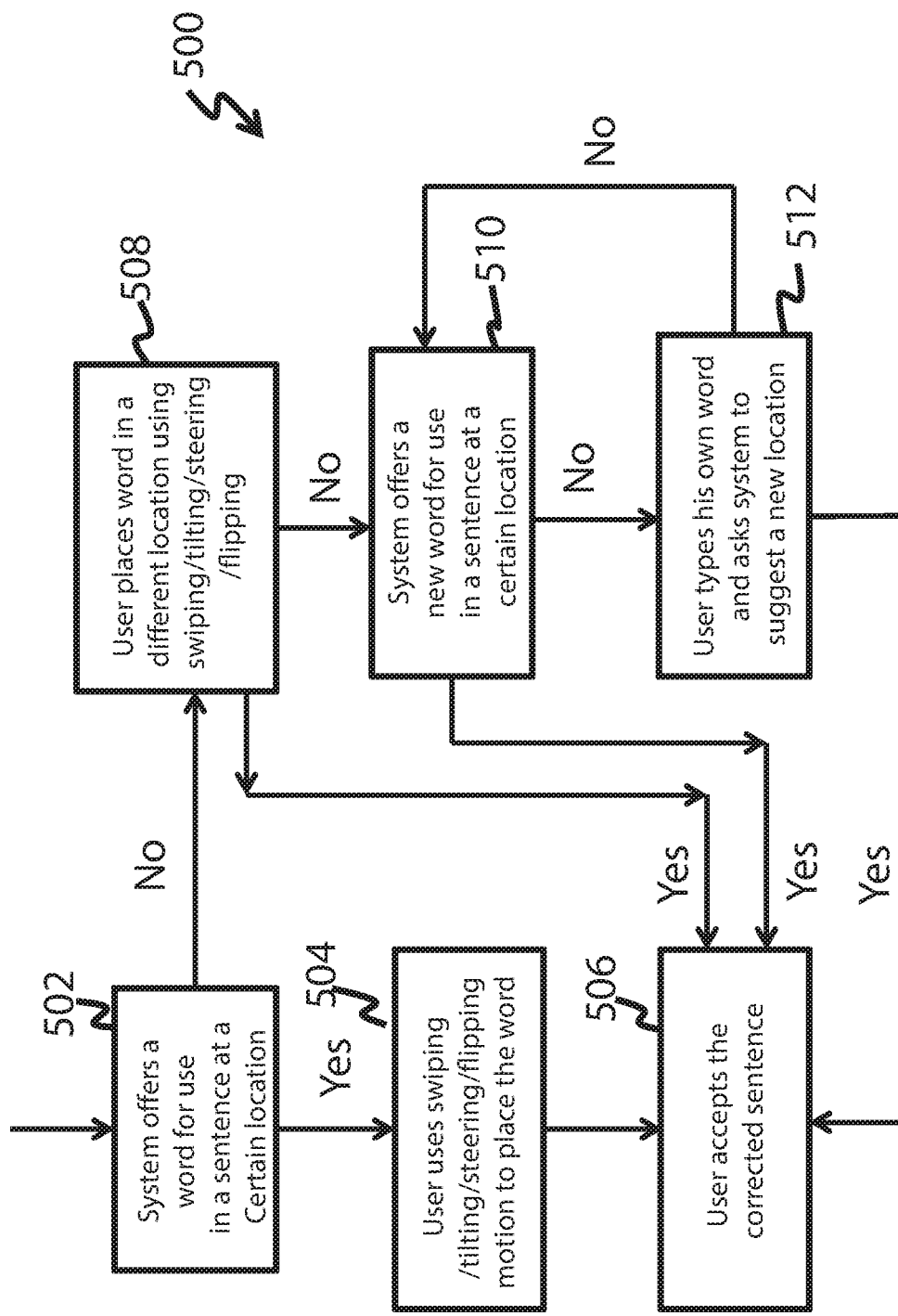
FIG. 6 is another embodiment where word selection followed by gestures promotes correct placement of the word based on grammar and gesture as a result of the intelligence algorithm.

FIGS. 5 and 6 depict exemplary uses of the system and the method detailed herein. The FIG. 5 depicts how the intelligence algorithm combines word selection with swiping to facilitate placing words in the proper position in a sentence or in a paragraph. In the FIG. 5, a sentence "The town was filled with streets and corners, trash in every crevice visible" is typed on the computer and appears as such on the computer screen (display). The author of the sentence desires to correct the sentence. Upon asking for choices to correct the sentence, a series of words that could be deployed in the sentence appears on the screen. The word choices offered the author as seen in the FIG. 5 are "dirty", "garbage", "genuinely", "plagued" and "seen". By tapping on the word "dirty" and swiping in the vertically upward direction, the sentence gets modified to "The town was filled with 'dirty' streets and corners, trash in every crevice visible". Similarly by tapping on the words "garbage" and swiping in the clockwise direction and the word "plagued" and swiping in the counter-clockwise direction as shown in the FIG. 5, the sentence is amended to "The town was 'plagued' with 'dirty' streets and corners, 'garbage' in every crevice visible." The placement of the words is effected by the direction of the swipe as well as by the intelligence algorithm.

FIG. 6 is another exemplary depiction of how the system functions to add words and phrases in the proper position in a sentence. The sentences typed by the author in the FIG. 6 prior to correction is as follows—"The town was filled with streets and corners, trash in every crevice visible. The residents all huddled and moved quickly through the shifting traffic. A black cat was seen climbing the trash cans. Now and then there are voices scooting throughout the alleys, destined to disturb. The night was like any other night, except the crawling away from the trash."

By tapping on the words "dirty", "bug" and "plagued" and swiping vertically upwards, clockwise upwards and counter-clockwise upwards respectively as shown in the FIG. 6, the sentence is modified to "The town was 'plagued' with 'dirty" streets and corners, trash in every crevice visible. The residents all huddled and moved quickly through the shifting traffic. A black cat was seen climbing the trash cans. Now and then there are voices scooting throughout the alleys, destined to disturb. The night was like any other night, except the 'bug' crawling away from the trash."

As can be seen in the FIGS. 5 and 6, the system facilitates best placement of a word or a phrase based on an existing sentence being built or augmented and where the user. The user selects a word from an offered choice of words and gestures by throwing the words in certain arcs. The word falls in place based on grammar and gesture as a result of placement by an intelligence algorithm.

The gestures include swiping in either a linear or curvilinear manner and where a direction of the linear swipes can include swipes from 1 to 360 degrees. The curvilinear swipes can include the use of clockwise or counter-clockwise arcs which position the word or phrase in a highlighted sentence in a specific position. Thus by tapping on a word and swiping in a particular direction the word can be accurately placed in a sentence. The intelligence algorithm weights each replacement word before placing it in a position in a sentence. The user can then accept the correction or reject it before trying another word choice.

This system is advantageous especially for a smart keyboard that offers mainly words as options for correcting sentences rather than letters. The logic used in this system would facilitate the best placement of a word or a phrase based on an existing sentence being built or augmented. In an embodiment, the user would just select and gesture by throwing the words in certain arcs and based on an intelligence algorithm, the word would fall in the correct place based on grammar and gesture.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a processor;
   a user interface comprising an edit region in operative communication with the processor, wherein the processor is in operative communication with one or more modules and operative to:
   receive from the user interface a selection of words in a form of a sentence;
   use a grammar test to determine if the sentence is grammatically accurate;
   parsing the sentence and offer a user a choice of words to improve an accuracy of the sentence, wherein the choice of words is based upon a weighted probability of several possible words that can improve the accuracy of the sentence;
   permitting the user to install a word from the choice of words in the sentence by performing an action involving one or more of swiping, tilting, steering or tapping of the user interface; and
   tilting the user interface through an angle from its previous position is conducted to move the word from one sentence to an adjacent sentence, wherein a direction of movement of the word is dependent upon a direction of angular movement of the user interface, and wherein a number of sentences between a sentence in which the word is located and an inputted last sentence is proportional to a plurality of times that the user interface is tilted.

2. The system of claim 1, where the one or modules include a spatial module that is operative to translate angular motion or rotary motion of the user interface into position sensitive information for a location of words in sentences, or alternatively, for a location of letters in a word.

3. The system of claim 1, where the one or modules include a gesture module that is operative to receive from the user interface one or more indications of user input detected at the edit region and to assemble information received from the edit region into a time-ordered sequence of motion events.

4. The system of claim 3, where the one or more indications of user input include tapping on a word or letter or swiping from a center of the edit region on a screen towards a periphery of the edit region.

5. The system of claim 1, where tapping on a particular word a plurality of times is combined with swiping across the edit region to facilitate locating a position for the word in a sentence.

6. The system of claim 5, where the system facilitates best placement of a word or a phrase based on an existing sentence being built or augmented and where the user:
selects a word from an offered choice of words;
gestures by throwing the words in certain arcs;
and where the word falls in place based on grammar and gesture as a result of placement by an intelligence algorithm.

7. The system of claim 6, where the gestures include swiping in either a linear or curvilinear manner, and where a direction of the linear swipes can include swipes from 1 to 360 degrees and where the curvilinear swipes can include the use of clockwise or counter-clockwise arcs which position the word or phrase in a highlighted sentence in a specific position.

8. The system of claim 1, where steering the user interface after a sentence is drafted ensures that a corrective word will be positioned into the sentence.

9. The system of claim 1, where shaking or vibrating the user interface reverses the last change.

10. The system of claim 1, where offering the user a choice of words comprises auto suggesting words that fit into the sentence or into several sentences at one time and where the suggested words are based on a subject/verb relationship in a sentence structure.

11. A method comprising:
inputting into an edit region of a user interface a plurality of sentences, wherein the user interface is in communication with a processor;

receiving from a choice of words to improve an accuracy of one or more sentences in the plurality of sentences, wherein the choice of words is based upon a weighted probability of several possible words that can improve the accuracy of the one or more sentences;

permitting the user to install a word from the choice of words in the one or more sentences by performing an action involving one or more of swiping, tilting, steering or tapping of the user interface; and tilting the user interface through an angle from its previous position is conducted to move the word from one sentence to an adjacent sentence, wherein a direction of movement of the word is dependent upon a direction of angular movement of the user interface, and wherein a number of sentences between a sentence in which the word is located and an inputted last sentence is proportional to a plurality of times that the user interface is tilted.

12. The method of claim 11, further comprising shaking or vibrating the user interface to reverse the last change.

13. The method of claim 11, where offering the user a choice of words comprises auto suggesting words that fit into the sentence or into several sentences at one time and where the suggested words are based on a subject/verb relationship in a sentence structure.

14. A computer program product comprising:
a non-transitory storage medium readable by a processing circuit and storing instructions for execution by the processing circuit for performing a method comprising:

inputting into an edit region of a user interface a plurality of sentences, wherein the user interface is in communication with a processor;

receiving from a choice of words to improve an accuracy of one or more sentences in the plurality of sentences, wherein the choice of words is based upon a weighted probability of several possible words that can improve the accuracy of the one or more sentences;

permitting the user to install a word from the choice of words in the one or more sentences by performing an action involving one or more of swiping, tilting, steering or tapping of the user interface; and tilting the user interface through an angle from its previous position is conducted to move the word from one sentence to an adjacent sentence, wherein a direction of movement of the word is dependent upon a direction of angular movement of the user interface, and wherein a number of sentences between a sentence in which the word is located and an inputted last sentence is proportional to a plurality of times that the user interface is tilted.

* * * * *